(12) United States Patent
Fukada

(10) Patent No.: US 9,802,615 B2
(45) Date of Patent: Oct. 31, 2017

(54) VEHICLE AND CONTROL METHOD FOR VEHICLE

(71) Applicant: TOYOTA JIDOSHA KABUSHIKI KAISHA, Toyota-shi, Aichi-ken (JP)

(72) Inventor: Shunro Fukada, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/439,810

(22) Filed: Feb. 22, 2017

(65) Prior Publication Data

US 2017/0253242 A1 Sep. 7, 2017

(30) Foreign Application Priority Data

Mar. 4, 2016 (JP) .................. 2016-042379

(51) Int. Cl.
| | |
|---|---|
| *B60W 10/06* | (2006.01) |
| *B60W 10/119* | (2012.01) |
| *B60W 30/182* | (2012.01) |
| *B60K 23/08* | (2006.01) |
| *F02N 11/08* | (2006.01) |
| *B60W 10/02* | (2006.01) |
| *B60W 50/14* | (2012.01) |
| *B60W 50/08* | (2012.01) |

(52) U.S. Cl.
CPC .......... *B60W 30/182* (2013.01); *B60K 23/08* (2013.01); *B60W 10/02* (2013.01); *B60W 10/06* (2013.01); *B60W 50/082* (2013.01); *B60W 50/14* (2013.01); *F02N 11/0803* (2013.01); *B60K 2023/0858* (2013.01); *B60W 2050/143* (2013.01); *B60W 2050/146* (2013.01); *B60W 2540/04* (2013.01); *B60W 2540/103* (2013.01); *B60W 2710/021* (2013.01); *B60W 2710/06* (2013.01)

(58) Field of Classification Search
CPC .... B60W 10/02; B60W 10/06; B60W 10/119; B60W 30/18018; B60W 30/182; B60K 23/08
See application file for complete search history.

(56) References Cited

U.S. PATENT DOCUMENTS

| | | | | |
|---|---|---|---|---|
| 6,524,217 | B1 * | 2/2003 | Murakami | ............. B60K 6/365 180/65.225 |
| 2012/0202648 | A1 * | 8/2012 | Kikura | .................. B60W 10/02 477/87 |
| 2012/0295759 | A1 * | 11/2012 | Fujiwara | ............. F02N 11/0844 477/167 |

FOREIGN PATENT DOCUMENTS

| | | |
|---|---|---|
| JP | 2015-193368 A | 11/2015 |
| WO | 2015/145241 A1 | 10/2015 |

* cited by examiner

*Primary Examiner* — Edwin A Young
(74) *Attorney, Agent, or Firm* — Oliff PLC

(57) ABSTRACT

Each of a first clutch and a second clutch is, for example, an electromagnetic clutch that is operated by an electromagnetic actuator, and is supplied with electric power from the same in-vehicle battery as a starter motor of an engine. An electronic control unit is configured to not change a drive mode during a stop of the engine, and, after a predetermined period has elapsed from a start of operation of the starter motor at a startup of the engine (for example, the startup has completed) and a battery voltage has been recovered, change the drive mode to any one of a two-wheel drive mode and a four-wheel drive mode with the first clutch and the second clutch.

10 Claims, 10 Drawing Sheets

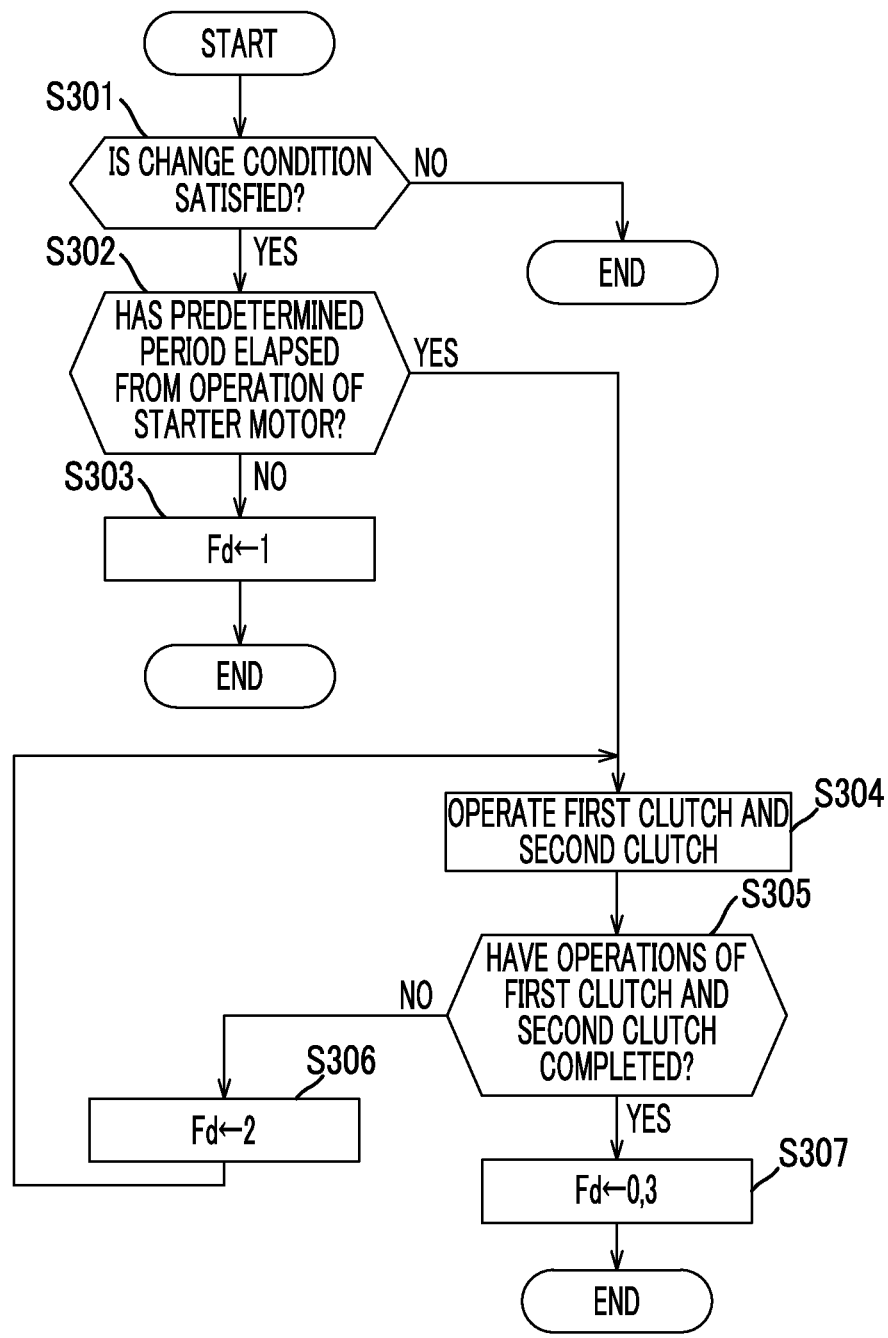

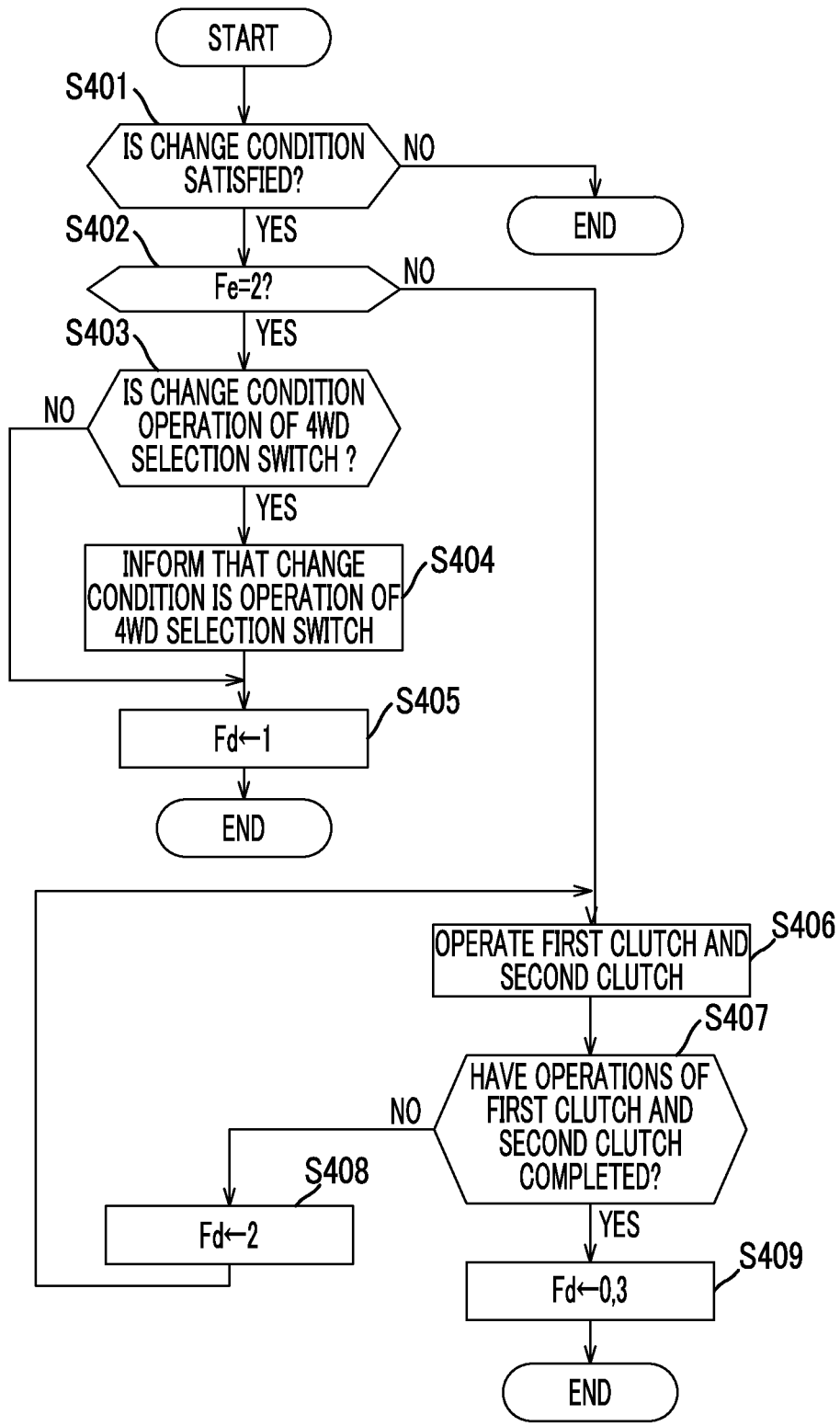

VEHICLE AND CONTROL METHOD FOR VEHICLE

INCORPORATION BY REFERENCE

The disclosure of Japanese Patent Application No. 2016-042379 filed on Mar. 4, 2016 including the specification, drawings and abstract is incorporated herein by reference in its entirety.

BACKGROUND

1. Technical Field

The disclosure relates to a vehicle and a control method for the vehicle that changes an operation status of an engine of the vehicle or a transmission status of driving force.

2. Description of Related Art

Conventionally, there is known a four-wheel drive vehicle (hereinafter, vehicle) configured to derive part of driving force that is transmitted from an engine mounted at the front of a vehicle body to front wheels with the use of a transfer and transmit the part of the driving force to rear wheels via a propeller shaft. In such vehicles, there is a vehicle that includes first and second clutches respectively provided upstream and downstream of the propeller shaft and that is configured to change a drive mode into a two-wheel drive mode (hereinafter, 2WD mode) or a four-wheel drive mode (hereinafter, 4WD mode) by operating these clutches.

For example, in the vehicle described in Japanese Patent Application Publication No. 2015-193368 (JP 2015-193368 A), first and second clutches are engaged in the 4WD mode, while the first and second clutches are released in the 2WD mode. With this configuration, a propeller shaft, and the like, do not rotate in the 2WD mode, so a mechanical loss is reduced. Each of the first and second clutches is a dog clutch that is operated by an electromagnetic actuator, and is engaged or released in response to a control command that is output from an ECU in accordance with a traveling status of the vehicle.

SUMMARY

Incidentally, in recent years, in order to further reduce fuel consumption, there is a vehicle configured to automatically stop an engine when a predetermined stop condition is satisfied even while the vehicle is traveling. For example, when a driver releases an accelerator pedal and a traveling speed of the vehicle becomes lower than or equal to a predetermined vehicle speed, the engine is stopped. After that, when a predetermined restart condition, such as a condition that the accelerator pedal is depressed again, is satisfied, the engine is started.

However, when the engine is started while the vehicle is traveling in this way, the drive mode can be changed from the 2WD mode to the 4WD mode in preparation for possible re-acceleration as a result of, for example, a decrease in the vehicle speed. The electromagnetic actuator is operated in order to change the drive mode from the 2WD mode to the 4WD mode. When a starter motor operates in order to start the engine while the rotation of at least one of the clutches is being synchronized, the voltage of an in-vehicle battery steeply decreases. For this reason, at least one of the clutches can be engaged in a state where synchronization of the clutch is not enough. This may cause vibration or noise or lead to a decrease in durability.

To this, it is conceivable to prohibit a startup of the engine while at least one of the clutches is being operated in order to change the drive mode as described above. However, if a startup of the engine is prohibited, a driver may experience a feeling of anxiety from a situation that the engine is not started immediately although the driver is depressing the accelerator pedal.

The disclosure is directed to, in a vehicle configured to automatically stop or restart an engine and to change a drive mode, reducing vibration or noise resulting from an operation of a clutch in a drivetrain and preventing a decrease in durability without causing a driver to experience a sense of anxiety.

In order to achieve the above object, according to the disclosure, the drive mode is not changed in a stopped state of an engine, with the result that an operation of a clutch for changing a drive mode and a decrease in a voltage of an in-vehicle battery resulting from a startup of the engine do not overlap with each other.

A first aspect of the disclosure provides a vehicle. The vehicle includes a pair of front wheels, a pair of rear wheels, an engine, a clutch, a battery and an electronic control unit. The engine includes a starter motor. The clutch is configured to be engaged and released to change a drive mode of the vehicle into any one of a four-wheel drive mode and a two-wheel drive mode. The four-wheel drive mode is a mode in which both the pair of front wheels and the pair of rear wheels are driven. The two-wheel drive mode is a mode in which any one of the pair of front wheels and the pair of rear wheels is driven. The starter motor of the engine and the clutch are configured to be supplied with electric power from the same battery. The electronic control unit is configured to change the engine into any one of an operating state and a stopped state while the vehicle is traveling. The electronic control unit is configured to operate the starter motor by supplying electric power from the battery to the starter motor when the engine is changed from the stopped state to the operating state. The electronic control unit is configured to execute drive mode change control for changing the drive mode into any one of the two-wheel drive mode and the four-wheel drive mode by operating the clutch with electric power, the electric power is supplied from the battery to the clutch while the vehicle is traveling. The electronic control unit is configured to not execute the drive mode change control when the engine is in the stopped state, and execute the drive mode change control after a lapse of a predetermined period from a start of operation of the starter motor at a startup of the engine.

With the above configuration, when the driver returns an accelerator pedal while the vehicle is traveling and then a vehicle speed has decreased, and when the engine is in the stopped state (including a period during which the engine coasts several times just before a stop), the drive mode is not changed from the 2WD mode to the 4WD mode. In this case, after that, after the engine is started by the electronic control unit as a result of, for example, the fact that the accelerator pedal is depressed by the driver, the drive mode is changed. At a startup of the engine, even when the voltage of the in-vehicle battery steeply decreases as a result of the operation of the starter motor, the clutch is operated by the electronic control unit after the voltage of the in-vehicle battery has recovered. For this reason, there is no concern that a decrease in the voltage adversely influences the operation of the clutch, so it is possible to reduce vibration or noise, and it is possible to prevent a decrease in durability. In this way, a startup of the engine is given a higher priority, so there is no concern that the driver experiences a sense of anxiety from a delay of the startup.

In the vehicle, the electronic control unit may be configured to determine the predetermined period is lapsed when a rotation speed of the engine becomes higher than or equal to a value set in advance. With the above configuration, after a startup of the engine completes and electric power is generated by an alternator, the clutch is operated, so the stability of the operation of the clutch is more easily ensured.

In the vehicle, the electronic control unit may be configured to determine the predetermined period is lapsed when a voltage of the battery becomes higher than or equal to a value set in advance. With the above configuration, the voltage of the in-vehicle battery decreases by a large amount in an initial phase of the operation of the starter motor and then gradually recovers, so it is possible to operate the clutch at earlier timing on the basis of a detected voltage.

In the vehicle, the electronic control unit may be configured to determine the predetermined period is lapsed when a lapse of a time set in advance.

In the vehicle, the electronic control unit may be configured to not change the engine into the stopped state when the drive mode change control is executed by the electronic control unit during operation of the engine.

In the vehicle, the electronic control unit may be configured to change the drive mode into the four-wheel drive mode when a vehicle speed becomes lower than or equal to a predetermined vehicle speed. The electronic control unit may be configured to change the engine into the operating state when an accelerator operation amount becomes higher than or equal to a predetermined accelerator operation amount.

In the vehicle, the vehicle may include an information unit, and the electronic control unit may be configured to change the drive mode in response to a switch operation of a driver of the vehicle. The electronic control unit may be configured to inform the driver of the vehicle through the information unit that the drive mode is not changed when the switch operation has been performed in the stopped state of the engine.

In the vehicle, the clutch may include a first clutch and a second clutch, the first clutch may be configured to transmit and interrupt driving force from the engine to a propeller shaft, and the second clutch may be configured to transmit and interrupt driving force from the propeller shaft toward the rear wheels. The electronic control unit may be configured to operate the first clutch and the second clutch such that a first period and a second period at least partially overlap with each other. The first period is a period that the drive mode is changed by the first clutch. The second is a period that the drive mode is changed by the second clutch. With this configuration, it is possible to quickly change the drive mode.

In the vehicle, the clutch may be at least one of a hydraulic clutch and an electromagnetic clutch, the hydraulic clutch may be configured to be operated by a hydraulic pressure that is supplied via an electromagnetic valve, and the electromagnetic clutch may be configured to be operated by an electromagnetic actuator.

A second aspect of the disclosure provides a control method for a vehicle. The vehicle includes an engine, a clutch, a battery and an electronic control unit. The engine includes a starter motor. The clutch is configured to be engaged or released to change a drive mode of the vehicle into any one of a four-wheel drive mode and a two-wheel drive mode. The four-wheel drive mode is a mode in which both a pair of front wheels and a pair of rear wheels are driven. The two-wheel drive mode is a mode in which any one of the pair of front wheels and the pair of rear wheels is driven. The starter motor of the engine and the clutch are configured to be supplied with electric power from the same battery. The control method includes: changing the engine into any one of an operating state and a stopped state while the vehicle is traveling; operating the starter motor by supplying electric power from the battery to the starter motor when the engine is changed from the stopped state to the operating state; executing drive mode change control for changing the drive mode into any one of the two-wheel drive mode and the four-wheel drive mode by operating the clutch with electric power that is supplied from the battery to the clutch while the vehicle is traveling; and not executing the drive mode change control when the engine is in the stopped state, and executing the drive mode change control after a lapse of a predetermined period from a start of operation of the starter motor at a startup of the engine.

With the above configuration, when the driver returns an accelerator pedal while the vehicle is traveling and then a vehicle speed has decreased, and when the engine is in the stopped state (including a period during which the engine coasts several times just before a stop), the drive mode is not changed from the 2WD mode to the 4WD mode. In this case, after that, after the engine is started by the electronic control unit as a result of, for example, the fact that the accelerator pedal is depressed by the driver, the drive mode is changed. At a startup of the engine, even when the voltage of the in-vehicle battery steeply decreases as a result of the operation of the starter motor, the clutch is operated by the electronic control unit after the voltage of the in-vehicle battery has recovered. For this reason, the drive mode is not changed when the engine is stopped while the vehicle is traveling, so, even when the voltage of the in-vehicle battery steeply decreases as a result of a startup of the engine, there is no concern that the operation of the clutch is adversely influenced. Therefore, it is possible to reduce vibration or noise, and it is possible to prevent a decrease in the durability of the clutch. A startup of the engine is given a higher priority, so there is no concern that the driver experiences a sense of anxiety from a delay of a startup of the engine although the driver is depressing an accelerator pedal.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a flowchart corresponding to FIG. 5, according to another embodiment configured to change the drive mode before completion of a startup of the engine; and FIG. 10 is a flowchart corresponding to FIG. 5, according to another embodiment that informs a driver in the case where a change of the drive mode is prohibited even when a 4WD selection switch has been operated.

DETAILED DESCRIPTION OF EMBODIMENTS

Hereinafter, an embodiment in which the control system according to the disclosure is applied to a four-wheel drive vehicle 1 (hereinafter, referred to as vehicle 1) will be described with reference to the accompanying drawings. The present embodiment is only illustrative, and is not intended to limit the configuration, application, and the like, of the disclosure.

Figure 1:
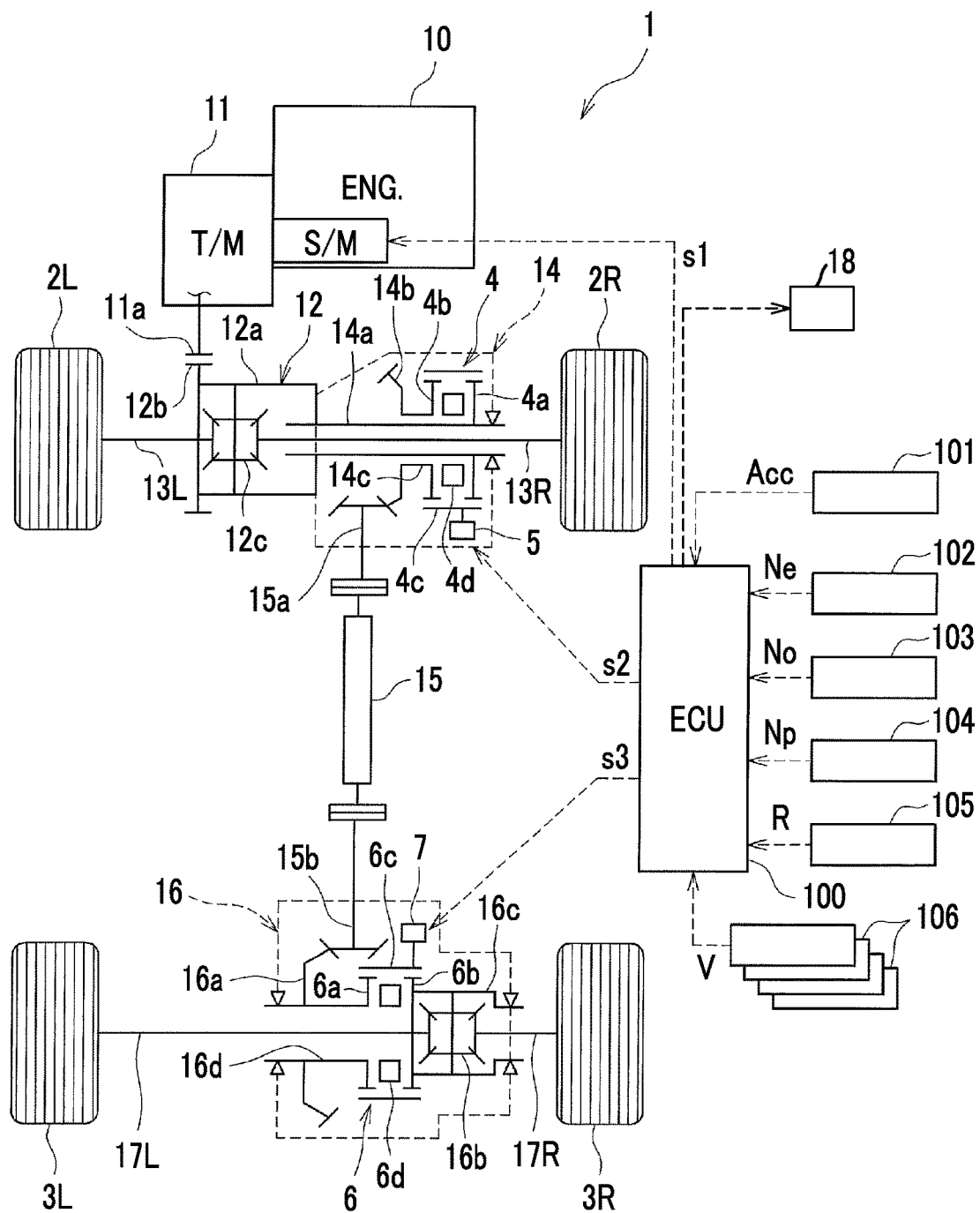
FIG. 1 is a schematic configuration view of a drivetrain of a vehicle and its control system according to an embodiment.

FIG. 1 shows the schematic configuration of a drivetrain. The vehicle 1 is a four-wheel drive vehicle based on an FF system. An engine 10 is mounted at the front of the vehicle 1. Right and left front wheels 2R, 2L (hereinafter, when not specifically distinguished from each other, referred to as front wheels 2) are main drive wheels that serve as drive wheels in both two-wheel drive mode (2WD mode) and four-wheel drive mode (4WD mode). On the other hand, right and left rear wheels 3R, 3L (hereinafter, when not specifically distinguished from each other, referred to as rear wheels 3) serve as driven wheels in the 2WD mode, and serve as drive wheels in the 4WD mode.

The engine 10 is a driving force source of the vehicle 1, and is, for example, a gasoline engine, a diesel engine, or the like. The engine 10 is provided with a starter motor 10a. At the startup of the engine 10, the starter motor 10a is configured to operate with electric power supplied from an in-vehicle battery (not shown), and forcibly rotate (crank) a crankshaft.

A power transmission path that transmits the output of the engine 10 to the front wheels 2 includes a transmission 11, a front differential 12 and right and left front wheel axles 13R, 13L (hereinafter, when not specifically distinguished from each other, referred to as front wheel axles 13). The front differential 12 is used to distribute the output of the engine 10 to the right and left front wheels 2. On the other hand, a power transmission path that transmits the output of the engine 10 to the rear wheels 3 includes a transfer 14, a propeller shaft 15, a rear differential unit 16 and right and left rear wheel axles 17R, 17L (hereinafter, when not specifically distinguished from each other, referred to as rear wheel axles 17). The transfer 14 takes out part of the output from the transmission 11. The propeller shaft 15 transmits the thus taken-out driving force toward the rear wheels 3. The rear differential unit 16 distributes the driving force, transmitted by the propeller shaft 15, to the right and left rear wheels 3.

As described above, the transmission 11 is shared by the front wheel-side and rear wheel-side two power transmission paths. For example, a known planetary gear multistage transmission, a continuously variable transmission, a synchromesh parallel two-shaft transmission, or the like, is employed as the transmission 11. An output gear 11a is provided on the output shaft (not shown) of the transmission 11. The output gear 11a is in mesh with a ring gear 12b provided on a case 12a of the front differential 12. The output gear 11a transmits the output of the engine 10 to the front differential 12.

The front differential 12 is a known differential gear. The front differential 12, for example, accommodates a differential gear mechanism 12c inside the case 12a. The differential gear mechanism 12c is formed of, for example, bevel gears. The front differential 12 transmits driving force to the right and left front wheel axles 13R, 13L while permitting a rotation difference between the right and left front wheel axles 13R, 13L as needed. The ring gear 12b is provided on one side (left side in FIG. 1) of the case 12a of the front differential 12 in the axial direction as described above, while the transfer 14 is connected to the other side (right side in FIG. 1) of the case 12a in the axial direction.

That is, the transfer 14 includes a cylindrical first rotating member 14a. One side of the first rotating member 14a in the axial direction is coupled to the case 12a of the front differential 12 by splines. The transfer 14 also includes a second rotating member 14c. The second rotating member 14c includes a ring gear 14b for transmitting power toward the rear wheels 3. The second rotating member 14c and the first rotating member 14a are selectively connected to or disconnected from each other by a first clutch 4.

The front wheel axle 13R is concentrically arranged on the radially inner side of the first rotating member 14a. Clutch teeth 4a are provided at the other side of the first rotating member 14a in the axial direction. The clutch teeth 4a constitute the first clutch 4. On the other hand, the first rotating member 14a and the front wheel axle 13R are concentrically arranged on the radially inner side of the second rotating member 14c. The ring gear 14b is provided at one side of the second rotating member 14c in the axial direction, and clutch teeth 4b are provided at the other side of the second rotating member 14c in the axial direction. The clutch teeth 4b constitute the first clutch 4.

The first clutch 4 is a dog clutch. The first clutch 4 includes the clutch teeth 4a, the clutch teeth 4b and a sleeve 4c. The sleeve 4c is used to connect the clutch teeth 4a and the clutch teeth 4b with each other. The sleeve 4c has a substantially cylindrical shape. The sleeve 4c has internal teeth (not shown) at its inner peripheral side. The internal teeth (not shown) are configured to mesh with the clutch teeth 4a, 4b. The sleeve 4c is moved in the axial direction by a first actuator 5, and changes the first clutch 4 between an engaged state and a released state. The first actuator 5 is, for example, an electromagnetic actuator.

The first clutch 4 further includes a synchronization mechanism 4d. The synchronization mechanism 4d is activated by the first actuator 5 to reduce the rotation difference between the first rotating member 14a and the second rotating member 14c. The first actuator 5 is configured to be supplied with electric power from the in-vehicle battery from which the starter motor 10a is supplied with electric power. The synchronization mechanism 4d is activated by energization of the first actuator 5, so the rotation difference between the first rotating member 14a and the second rotating member 14c reduces. The energization is stopped after the rotation difference is sufficiently reduced. After that, the first clutch 4 is engaged.

FIG. 1 shows the released state of the first clutch 4. In the released state, the first rotating member 14a and the second rotating member 14c are not connected to each other, so no driving force is transmitted. Although not shown in the drawing, as the sleeve 4c is moved by the first actuator 5 as described above and then the first clutch 4 is engaged, the first rotating member 14*a* and the second rotating member 14*c* are connected to each other (that is, the first clutch 4 is engaged), with the result that driving force is transmitted.

Thus, part of driving force transmitted from the transmission 11 to the front differential 12 is taken out by the transfer 14, and is transmitted to the rear differential unit 16 by a driven pinion 15*a*, the propeller shaft 15 and a drive pinion 15*b*. That is, the driven pinion 15*a* connected to the front end of the propeller shaft 15 is in mesh with the ring gear 14*b*, while the drive pinion 15*b* that is in mesh with a ring gear 16*a* of the rear differential unit 16 is connected to the rear end of the propeller shaft 15.

The rear differential unit 16 transmits driving force, which is transmitted to the ring gear 16*a* as described above, to the right and left rear wheel axles 16R, 16L, while permitting a rotation difference between the right and left rear wheel axles 16R, 16L as needed. A differential gear mechanism 16*b* is accommodated in a differential case 16*c*. The differential gear mechanism 16*b* is formed of, for example, bevel gears. The rear differential unit 16 includes a cylindrical rotating member 16*d* that rotates integrally with the ring gear 16*a*. The rotating member 16*d* and the differential case 16*c* are selectively connected to or disconnected from each other by a second clutch 6. The second clutch 6 is a dog clutch.

That is, the ring gear 16*a* is provided at one side of the rotating member 16*d* in the axial direction as described above, while clutch teeth 6*a* are provided at the other side of the rotating member 16*d* in the axial direction. The clutch teeth 6*a* constitute the second clutch 6. The differential case 16*c* includes clutch teeth 6*b* that constitute the second clutch 6. The second clutch 6 includes a sleeve 6*c* in order to connect the clutch teeth 6*a* and the clutch teeth 6*b* with each other.

The sleeve 6*c* has a substantially cylindrical shape. The sleeve 6*c* has internal teeth (not shown) at its inner peripheral side. The internal teeth (not shown) are configured to mesh with the clutch teeth 6*a*, 6*b*. The sleeve 6*c* is moved in the axial direction by a second actuator 7, and changes the second clutch 6 between an engaged state and a released state. The second actuator 7 is, for example, an electromagnetic actuator. The second actuator 7 is configured to be supplied with electric power from the in-vehicle battery. The second clutch 6 also includes a synchronization mechanism 6*d*. As in the case of the first clutch 4, the synchronization mechanism 6*d* is activated by energization of the second actuator 7, the energization is stopped, and then the second clutch 6 is engaged.

In the thus configured drivetrain, when the first clutch 4 and the second clutch 6 both are engaged, driving force is transmitted toward not only the front wheels 2 but also the rear wheels 3, with the result that the vehicle 1 is placed in the 4WD mode in which the vehicle 1 is driven by the use of the front wheels 2 and the rear wheels 3. On the other hand, when any one of the first clutch 4 and the second clutch 6 is released, no driving force is transmitted to the rear wheels 3, with the result that the vehicle 1 is placed in the 2WD mode in which the vehicle 1 is driven by the use of only the front wheels 2. That is, the drive mode of the vehicle 1 is changed by operating the first clutch 4 and the second clutch 6.

In the 2WD mode, usually, both the first clutch 4 and the second clutch 6 are released, and the driven pinion 15*a*, the propeller shaft 15 and the drive pinion 15*b* between the first clutch 4 and the second clutch 6 do not rotate. Thus, a mechanical loss is reduced. In this way, the drive mode in which the rotation of the propeller shaft 15, and the like, stops (that is, the 2WD mode in which co-rotation is prevented) is also called disconnection state.

In the present embodiment, an electronic control unit (ECU) 100 is mounted on the vehicle 1. The ECU 100 is configured to not only execute operation control over the engine 10 but also change the drive mode of the vehicle 1 (change the drive mode between the above-described 2WD mode and the above-described 4WD mode) by operating the first clutch 4 and the second clutch 6 as described above. Although not specifically shown in the drawing, the ECU 100 is configured as a microcomputer including, for example, a CPU, a RAM, a ROM, input/output interfaces, and the like. The ECU 100 executes various controls over the vehicle 1 by executing various control programs.

That is, for example, an accelerator operation amount sensor 101, engine rotation speed sensor 102, transmission output rotation speed sensor 103, propeller shaft rotation speed sensor 104, 4WD selection switch 105, wheel speed sensors 106, and the like, of the vehicle 1 are connected to the ECU 100. An accelerator operation amount Act, an engine rotation speed Ne, a transmission output rotation speed No, a propeller shaft rotation speed Np, a 4WD request R, wheel speeds v, and the like, are input as signals of the above-described sensors, and the like. The ECU 100 calculates a travel speed V (vehicle speed V) of the vehicle 1 on the basis of the wheel speeds of the front wheels 2 and rear wheels 3 (for example, as an average of those wheel speeds).

On the other hand, for example, an engine output control command signal s1, a control signal s2 to the first actuator 5, a control signal s3 to the second actuator 7, and the like, are output from the ECU 100. The engine output control command signal s1 is used to control the output of the engine 10, and includes control signals to actuators of a throttle valve, injectors, igniters, and the like, a control signal to the starter motor 10*a*, and the like. The control signal s2 to the first actuator 5 is used to operate the first clutch 4. The control signal s3 to the second actuator 7 is used to operate the second clutch 6.

Specifically, the ECU 100 controls the output of the engine 10 by controlling the intake air amount, fuel injection amount, ignition timing, and the like, of the engine 10. In the present embodiment, when a predetermined stop condition is satisfied even while the vehicle 1 is traveling, the engine 10 is stopped in order to reduce fuel consumption. After an engine stop, when a predetermined restart condition is satisfied, for example, when an accelerator pedal is depressed again, the engine 10 is started.

The ECU 100 changes the drive mode of the vehicle 1 (changes the drive mode between the above-described 2WD mode and the above-described 4WD mode) by controlling the first clutch 4 and the second clutch 6 as described above. The ECU 100 that controls the engine 10 or the drivetrain in this way is schematically shown as a single ECU in FIG. 1; however, actually, the ECU 100 is separately formed of a plurality of ECUs, such as an engine control ECU and a drivetrain control ECU.

A change of the drive mode will be more specifically described. As shown in one example in FIG. 2, for example, when a driver has releases the accelerator pedal and, as a result, the vehicle speed V decreases to a predetermined first vehicle speed V1 (time t1), the drive mode is changed from the 2WD mode to the 4WD mode in preparation for re-acceleration that is expected thereafter. That is, energization of the first actuator 5 and second actuator 7 is started at time t1, the input-side rotation and the output-side rotation are synchronized with each other by activating the synchronization mechanisms 4d, 6d respectively in the first clutch 4 and the second clutch 6.

In the example of the chart, the driver depresses the accelerator pedal (time t2) in the middle of synchronization of the rotation of each of the first clutch 4 and the second clutch 6, and the output of the engine 10 increases accordingly. For this reason, the engine rotation speed Ne increases from time t3 with a slight delay, and the vehicle speed V also increases. When synchronization of the rotation of the first clutch 4 completes at time t4 and energization of the first actuator 5 is stopped, the first clutch 4 is engaged. Subsequently, synchronization of the rotation of the second clutch 6 also completes at time t5, energization of the second actuator 7 is stopped, and then the second clutch 6 is also engaged. In this way, a change of the drive mode into the 4WD mode completes.

As described above, in the present embodiment, the drive mode of the vehicle 1 is changed from the 2WD mode to the 4WD mode in response to a decrease in the vehicle speed V. However, if the engine 10 is attempted to be started at the time when the first clutch 4 and the second clutch 6 are operated, the voltage of the in-vehicle battery (battery voltage) steeply decreases with the operation of the starter motor 10a, so there is a concern about instable operation of each of the first clutch 4 and the second clutch 6.

Figure 2:
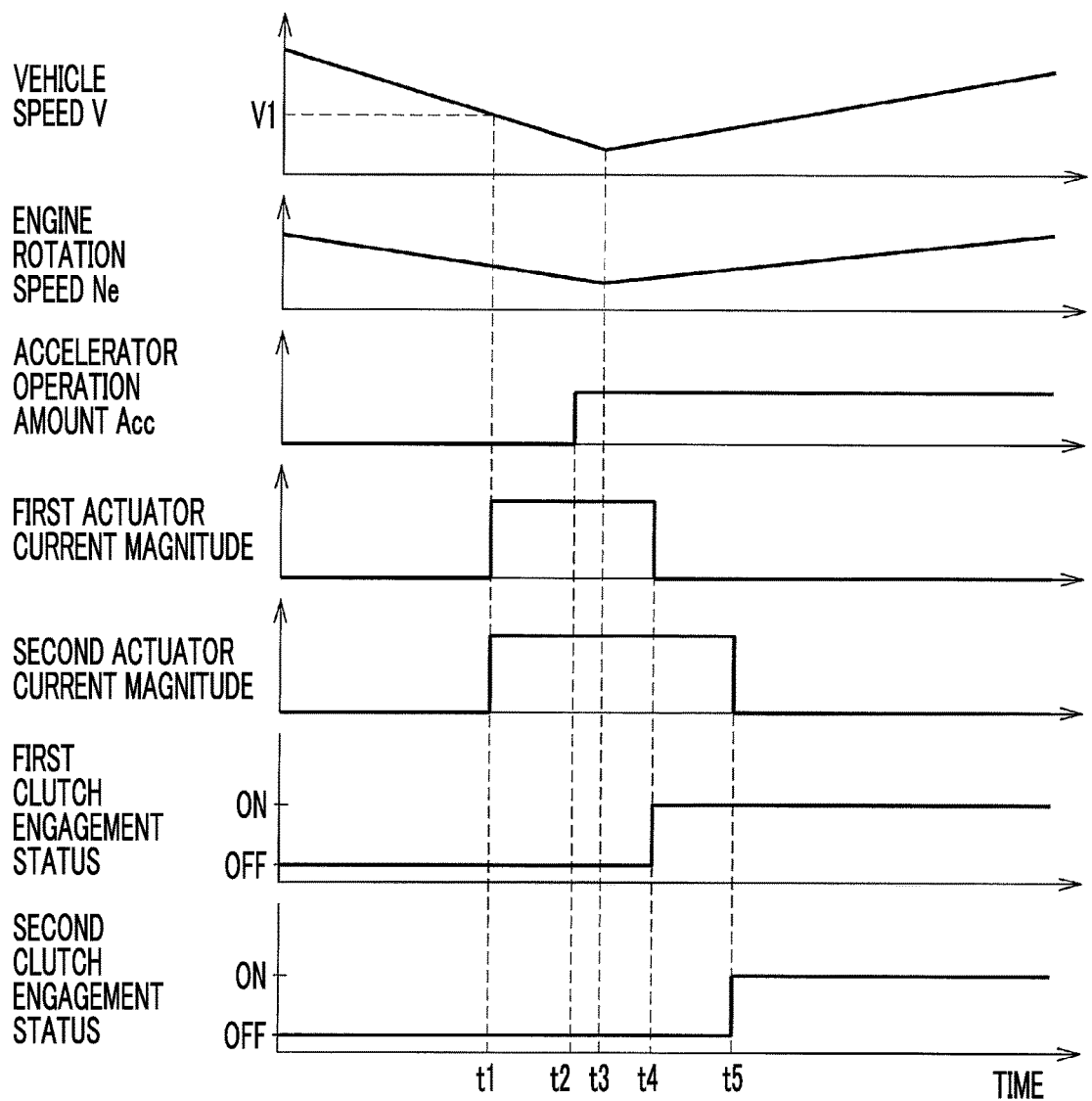
FIG. 2 is a timing chart that shows an example of changes in vehicle speed, accelerator operation amount, and the like, and engagement operation of each clutch in control for changing a drive mode of a vehicle.
Figure 3:
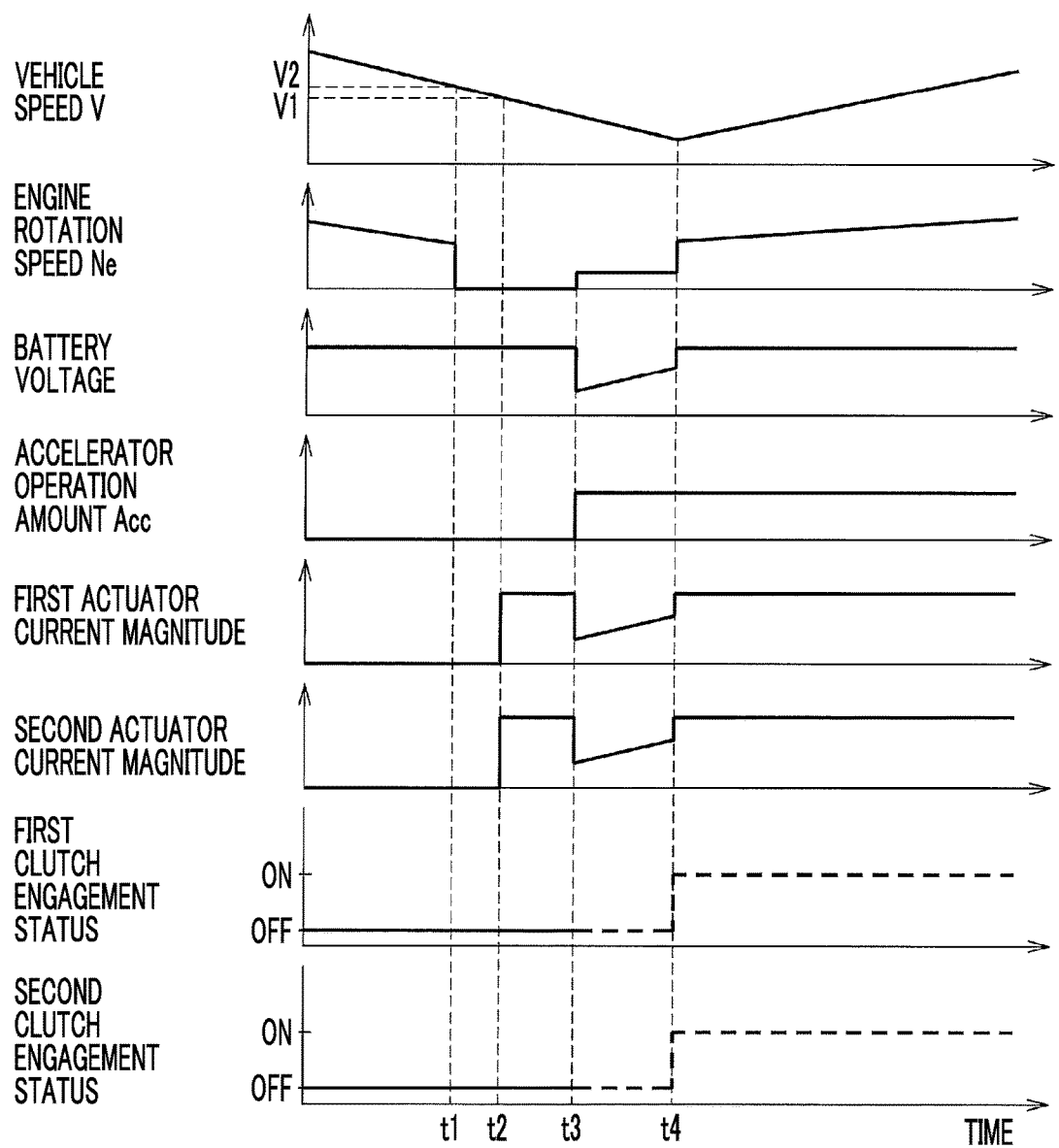
FIG. 3 is a chart corresponding to FIG. 2, additionally showing a change in battery voltage in the case where a change of the drive mode and a start of an engine overlap with each other.

Specifically, as shown in one example in FIG. 3, for example, it is assumed that a driver releases the accelerator pedal, the vehicle speed V decreases to a second vehicle speed V2 higher than the first vehicle speed V1, the engine 10 is automatically stopped (time t1) and then the vehicle speed V further decreases to the first vehicle speed V1. In this case, as shown in FIG. 2, in order to change the drive mode from the 2WD mode to the 4WD mode as described above, energization of the first actuator 5 and second actuator 7 is started at time t2.

Thus, the synchronization mechanisms 4d, 6d of the first clutch 4 and second clutch 6 are activated, and the input-side rotation and the output-side rotation of each of the first clutch 4 and second clutch 6 are synchronized with each other. However, for example, when the driver depresses the accelerator pedal in the middle of the synchronization (time t3), cranking for starting the engine 10 is started (the engine rotation speed Ne increases). At this time, as a result of the operation of the starter motor 10a that consumes large current, the battery voltage steeply decreases (t3 to t4).

As a result, the amount of energization of each of the first actuator 5 and the second actuator 7 steeply reduces, so each of the first actuator 5 and the second actuator 7 generates an insufficient amount of power for normally operating a corresponding one of the first clutch 4 and the second clutch 6, with the result that synchronization of rotation delays or synchronization becomes insufficient. If the first clutch 4 and the second clutch 6 are engaged in such a state, tooth contact occurs since each of the first clutch 4 and the second clutch 6 is a dog clutch, with the result that vibration or noise occurs, and each of the first clutch 4 and the second clutch 6 can fail to be engaged (schematically indicated by the dashed lines in FIG. 3) and, in addition, this may lead to a decrease in the durability of each of the first clutch 4 and the second clutch 6.

For such inconveniences, when the first clutch 4 or the second clutch 6 is being operated in order to change the drive mode as described above, it is conceivable to prohibit a startup of the engine 10. However, if a startup of the engine 10 is prohibited while the first clutch 4 or the second clutch 6 is being operated, the driver may experience a feeling of anxiety from a situation that the engine 10 is not started until engagement of each of the first clutch 4 and the second clutch 6 completes, that is, a startup of the engine 10 delays, although the driver is depressing the accelerator pedal.

In the present embodiment, when the engine 10 is stopped while the vehicle 1 is traveling, the operation of each of the first clutch 4 and the second clutch 6 for changing the drive mode is prohibited, and a startup of the engine 10 is given a higher priority when there is a request to start the engine 10. With this configuration, it is possible to prevent the overlap of a steep decrease in the battery voltage at an engine startup with the operation of each of the first clutch 4 and the second clutch 6 as described above, leading to an inconvenience.

Hereinafter, the routine of automatic stop control over the engine 10 and the routine of drive mode change control through the operation of each of the first clutch 4 and the second clutch 6 will be specifically described with reference to the flowcharts respectively shown in FIG. 4 and FIG. 5. Each of the routine of automatic stop control over the engine 10 and the routine of drive mode change control is executed at predetermined timing (for example, at set time intervals) while an ignition switch of the vehicle 1 is in an on state. The drive mode change control is control for changing the drive mode of the vehicle 1 to any one of the two-wheel drive mode (2WD mode) and the four-wheel drive mode (4WD mode) by operating the first clutch 4 and the second clutch 6.

Figure 4:
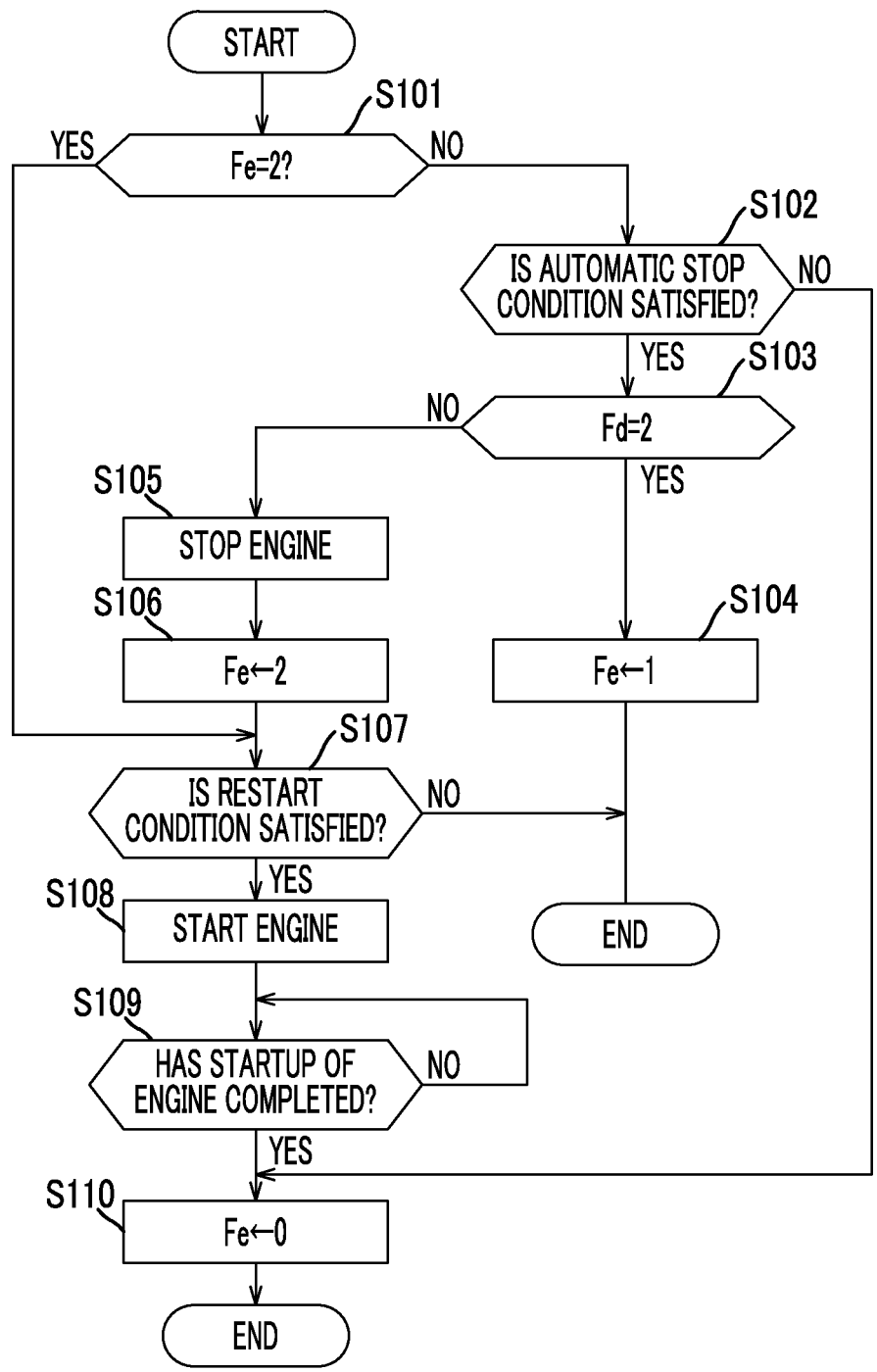
FIG. 4 is a flowchart that shows a routine of engine automatic stop control.

Initially, with the routine of automatic stop control over the engine 10, shown in FIG. 4, it is determined in step S101 after the start of the routine whether the value of a flag Fe indicating the status of the engine 10 is "2". When the value of the flag Fe is "0", it indicates that the engine 10 is in operation. When the value of the flag Fe is "1", it indicates that the engine 10 is in a stop standby state where a stop of the engine 10 is waited in an engine operating state. When the value of the flag Fe is "2", it indicates that the engine 10 is stopped. For this reason, when affirmative determination is made on the basis of the fact that Fe=2 (YES), the process proceeds to step S107 (described later). On the other hand, when negative determination is made on the basis of the fact that Fe=0 or 1 (NO), the process proceeds to step S102.

The ECU 100 determines whether an automatic stop condition of the engine 10 during traveling of the vehicle 1 is satisfied. When negative determination is made (NO), the process proceeds to step S110 (described later) in order to continue operating the engine 10, whereas, when affirmative determination is made (YES), the process proceeds to step S103. The automatic stop condition of the engine 10 is, for example, set to include a condition that the accelerator is in an off state (the accelerator operation amount Act is at or below a predetermined threshold and is substantially zero), a condition that the vehicle speed V is lower than or equal to a predetermined vehicle speed V2, and the like.

In step S103, the ECU 100 determines whether the value of a flag Fd indicating the drive mode of the vehicle 1 is "2". When the value of the flag Fd is "0", it indicates that the drive mode is the 2WD mode. When the value of the flag Fd is "1", it indicates that the drive mode is in a change standby state. When the value of the flag Fd is "2", it indicates that at least any one of the clutches is operating. When the value of the flag Fd is "3", it indicates that the drive mode is the 4WD mode. When affirmative determination is made on the basis of the fact that Fd=2 (YES), because at least one of the first clutch 4 and the second clutch 6 is being operated in order to change the drive mode, so the process proceeds to step S104 and the engine 10 is on standby without being stopped, and the value of the flag Fe is set to "1" (Fe←1), after which the process once ends (END).

That is, when at least one of the first clutch 4 and the second clutch 6 is being operated in order to change the drive mode while the vehicle 1 is traveling, the operating engine 10 is not immediately stopped even when the automatic stop condition is satisfied.

On the other hand, when negative determination is made on the basis of the fact that the value of the flag Fd is not "2" (NO), the process proceeds to step S105, and the operation of the engine 10 is stopped. That is, when the rotation of the crankshaft is completely stopped by stopping fuel injection from the injectors of the engine 10 and ignition by the igniters, the process proceeds to step 106, and the value of the flag Fe is set to "2" (Fe←2).

Subsequently, in step S107, the ECU 100 determines whether the restart condition of the engine 10 is satisfied. When negative determination is made (NO), the process once ends (END). On the other hand, when affirmative determination is made on the basis of the fact that the restart condition is satisfied (YES), the process proceeds to step S108, and the engine 10 is started. The restart condition may be, for example, set to include a condition that the accelerator is in an on state (the accelerator operation amount Act exceeds the predetermined threshold), a condition that a predetermined operation, such as a steering operation and a brake operation, is carried out by the driver, and the like.

In order to start the engine 10, cranking is started by operating the starter motor 10a, and injection of fuel by the injectors, ignition control over the igniters, and the like, are started. Combustion begins in any one of the cylinders (initial combustion). When the engine rotation speed Ne increases to a value set in advance, and it is determined that the startup of the engine 10 has completed (YES in step S109), the process proceeds to step S110, and the value of the flag Fe is set to "0" (Fe←0), after which the process once ends (END).

When the restart condition of the engine 10 is satisfied, the engine 10 is started without checking the value of the flag Fd indicating the drive mode of the vehicle 1 unlike the case where the automatic stop condition is satisfied. In other words, a startup of the engine 10 is performed in preference to the drive mode change control.

Figure 5:
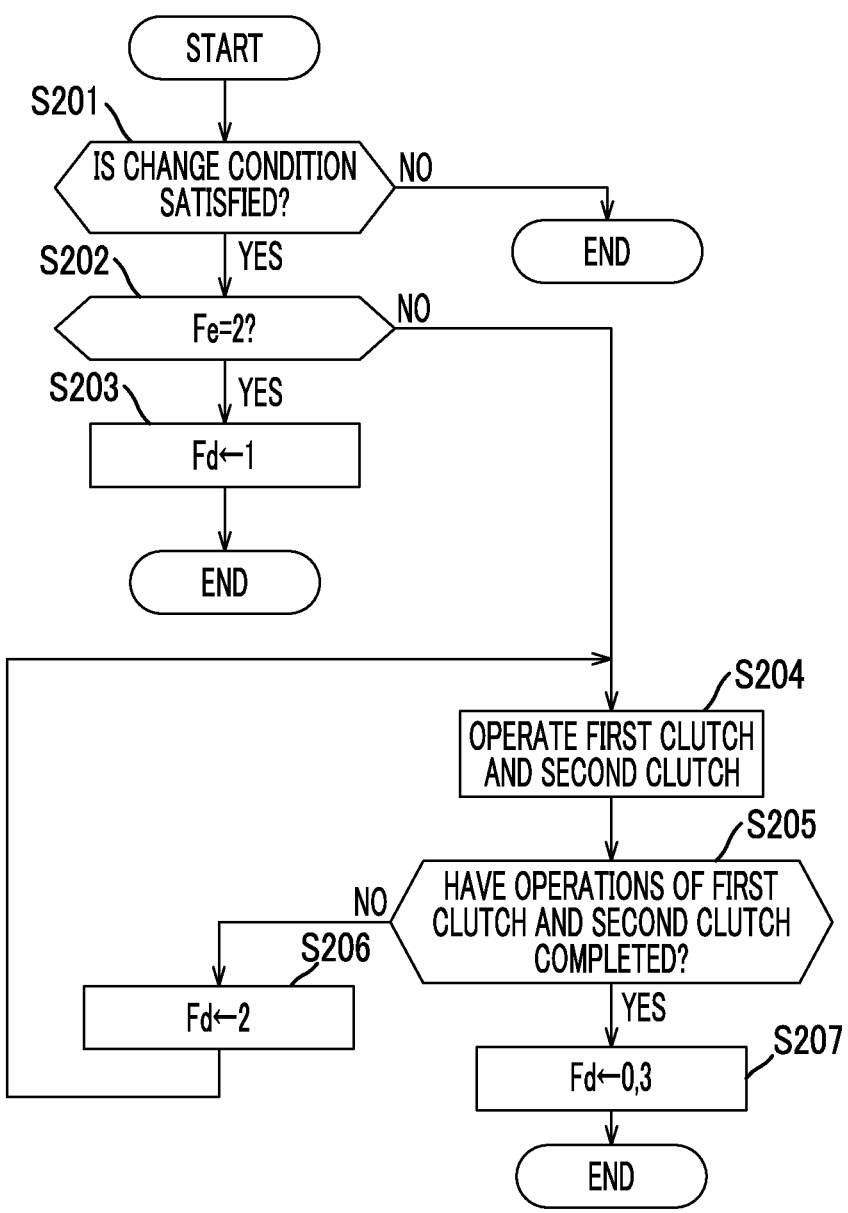
FIG. 5 is a flowchart that shows a routine of drive mode change control.

Next, with the routine of drive mode change control, shown in FIG. 5, the ECU 100 determines in step S201 after the start of the routine whether a drive mode change condition is satisfied. When negative determination is made (NO), the process once ends; whereas when affirmative determination is made (YES), the process proceeds to step S202. The change condition may be, for example, set to include a condition that the vehicle speed V is lower than or equal to the predetermined vehicle speed V1, a condition that the drive mode is the 2WD mode and the 4WD selection switch 105 has been operated, and the like.

In step S202, the ECU 100 determines whether the value of the flag Fe indicating the operation status of the engine 10 is "2". When affirmative determination is made on the basis of the fact that Fe=2 (YES), because the engine 10 is stopped, the process proceeds to step S203, the engine 10 is on standby without starting the operation of each of the first clutch 4 and the second clutch 6 for changing the drive mode, and the value of the flag Fd is set to "1" (Fd←1), after which the process once ends (END).

That is, when the engine 10 is stopped while the vehicle 1 is traveling, because it is not clear when to execute control for starting the engine 10, the first clutch 4 and the second clutch 6 are not operated even when the drive mode change condition is satisfied, and the first clutch 4 and the second clutch 6 are set in a change standby state.

On the other hand, when negative determination is made in step S202 on the basis of the fact that the value of the flag Fe is not "2" (NO), the process proceeds to step S204 because the engine is in operation (including the stop standby state), and the first actuator 5 and the second actuator 7 are energized in order to operate the first clutch 4 and the second clutch 6. For example, in the case of changing the drive mode from the 2WD mode to the 4WD mode, synchronization of rotation is performed by energizing the first actuator 5 and the second actuator 7, and then the first clutch 4 and the second clutch 6 are engaged.

That is, when the ECU 100 determines that a deviation between the transmission output rotation speed No and the propeller shaft rotation speed Np, that is, a rotation difference between the input side and output side of the first clutch 4, is sufficiently reduced on the basis of a signal from the transmission output rotation speed sensor 103 and a signal from the propeller shaft rotation speed sensor 104, energization of the first actuator 5 is stopped, and the first clutch 4 is engaged.

Subsequently, when the ECU 100 determines that a deviation between the propeller shaft rotation speed Np and a rotation speed corresponding to the vehicle speed V, that is, a rotation difference between the input side and output side of the second clutch 6, is sufficiently reduced, energization of the second actuator 7 is stopped, and the second clutch 6 is engaged. In this way, in the present embodiment, the operating period of the first clutch 4 and the operating period of the second clutch 6 are configured to partially overlap with each other. With this configuration, it is advantageous that the drive mode is quickly changed.

In step S205, the ECU 100 determines whether the operations of the first clutch 4 and second clutch 6 have completed. When negative determination is made on the basis of the fact that the operations have not completed yet (NO), the value of the flag Fd is set to "2" in step S206 (Fd←2), and then the process returns to step S204. On the other hand, when affirmative determination is made on the basis of the fact that the operations have completed (YES), the value of the flag Fd is set to "0" or "3" in step S207 (Fd←0, 3), after which the process once ends (END).

That is, when the drive mode change condition is satisfied during operation of the engine 10 (including the stop standby state), the first clutch 4 and the second clutch 6 are operated, and the value of the flag Fd is kept at "2" until the operations complete. Thus, an automatic stop of the engine 10 is prohibited as described with reference to FIG. 4. When the operations of the first clutch 4 and second clutch 6 complete, the value of the flag Fd is set to "0" or "3", and an automatic stop of the engine 10 is enabled.

The ECU 100 that executes the steps of the flowchart of FIG. 4 constitutes an engine control unit that changes the engine 10 into any one of the operating state and the stopped state while the vehicle 1 is traveling. The engine control unit does not change the engine into the stopped state while the drive mode is being changed through the operations of the first clutch 4 and second clutch 6 during operation of the engine 10.

The ECU 100 that executes the steps of the flowchart of FIG. 5 constitutes a drive control unit that changes the drive mode into any one of the 2WD mode and the 4WD mode by operating the first clutch 4 and the second clutch 6 while the vehicle 1 is traveling. The drive control unit does not change the drive mode during a stop of the engine 10, but the drive control unit changes the drive mode during operation of the engine 10 or after completion of start control over the engine 10.

Specifically, the drive control unit changes the drive mode after a predetermined period has elapsed from the start of operation of the starter motor 10a at a startup of the engine 10 and the battery voltage has recovered. A lapse of the predetermined period is determined on the basis of the fact that the engine rotation speed Ne becomes higher than or equal to a value set in advance (a set value at which it is determined that the startup of the engine 10 has completed).

Figure 6:
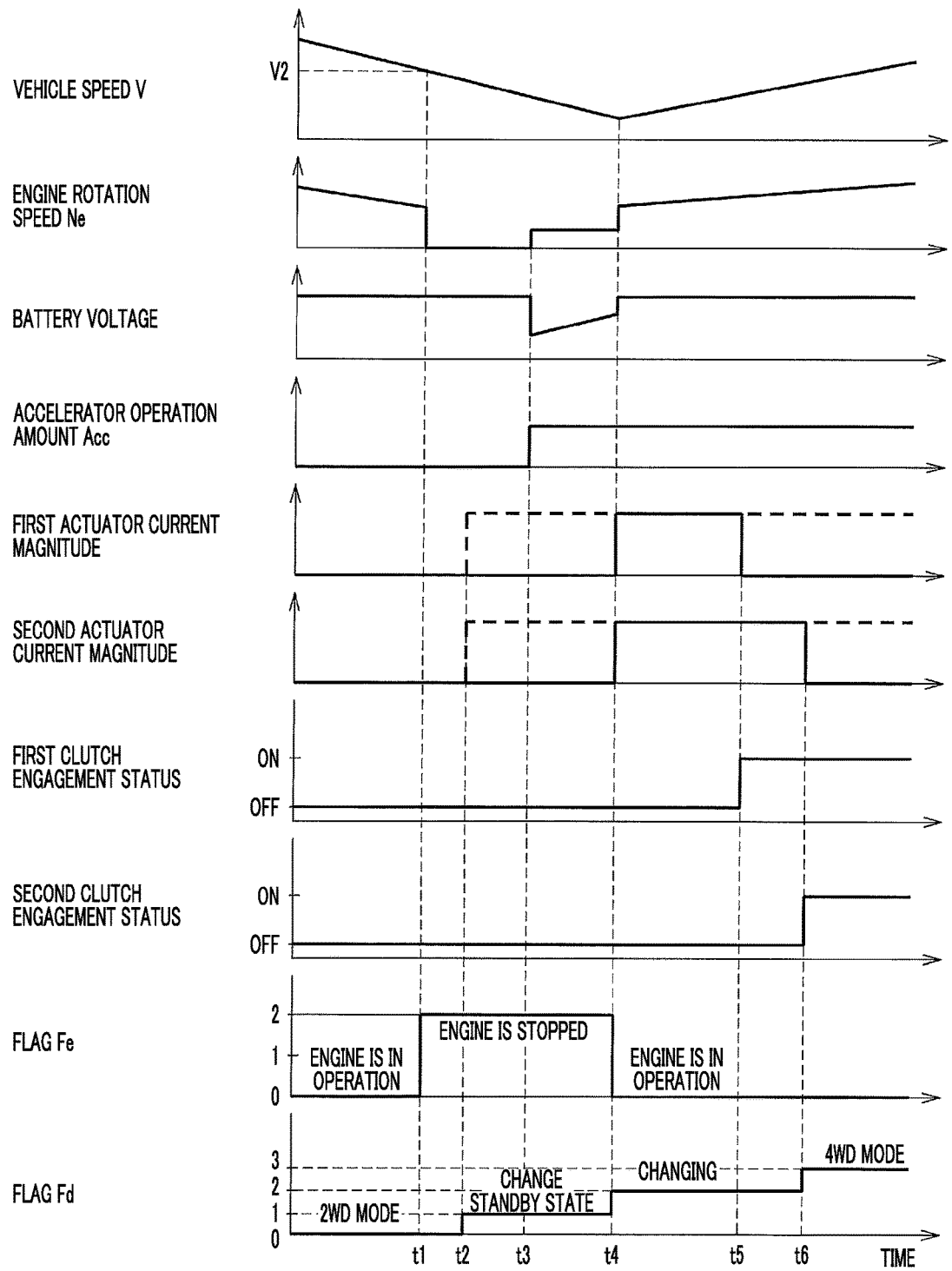
FIG. 6 is a chart corresponding to FIG. 2, showing a case where a drive mode change condition is satisfied after the engine is automatically stopped.

Hereinafter, engine control and drive change control according to the present embodiment in the case where the engine 10 automatically stops as a result of a decrease in the vehicle speed V and then the drive mode change condition is satisfied as in the case of the example of FIG. 3 will be described with reference to FIG. 6. That is, when the vehicle speed V decreases to the second vehicle speed V2 as shown in the chart and the engine 10 is automatically stopped (time t1), the value of the flag Fe changes from "0" to "2", so, even when the vehicle speed V decreases to the first vehicle speed V1 after a stop of the engine 10 and the drive mode change condition is satisfied (time t2), the first clutch 4 and second clutch 6 are not operated (energization of the first actuator 5 and the second actuator 7, indicated by the dashed lines, is not started).

When the driver depresses the accelerator pedal at time t3 and the restart condition is satisfied, cranking is started by giving a higher priority to a startup of the engine 10 (the engine rotation speed Ne increases). At this time, the battery voltage steeply decreases as a result of the operation of the starter motor 10a that consumes large current; however, because the first actuator 5 and the second actuator 7 are not energized, the steep decrease in the battery voltage does not adversely influence the operations of the first clutch 4 and second clutch 6.

When the startup of the engine 10 completes in this way and the value of the flag Fe is set to "0" (time t4), energization of the first actuator 5 and the second actuator 7 is started, and the first clutch 4 and the second clutch 6 begin to operate (Fd=2). That is, the synchronization mechanisms 4d, 6d of the first clutch 4 and second clutch 6 are activated, and the input-side rotation and output-side rotation of each of the first clutch 4 and the second clutch 6 are synchronized with each other. When energization of the first actuator 5 is stopped at time t5, the first clutch 4 is engaged.

Subsequently, when synchronization of rotation of the second clutch 6 also completes at time t6 and energization of the second actuator 7 is stopped, the second clutch 6 is also engaged. Thus, a change into the 4WD mode completes (Fd=3). In this way, after the battery voltage has recovered after completion of the startup of the engine 10, the first clutch 4 and the second clutch 6 are operated. For this reason, there is no concern that a decrease in the battery voltage adversely influences the operations of the first clutch 4 and second clutch 6, so it is possible to reduce vibration or noise, and it is possible to prevent a decrease in durability.

Figure 7:
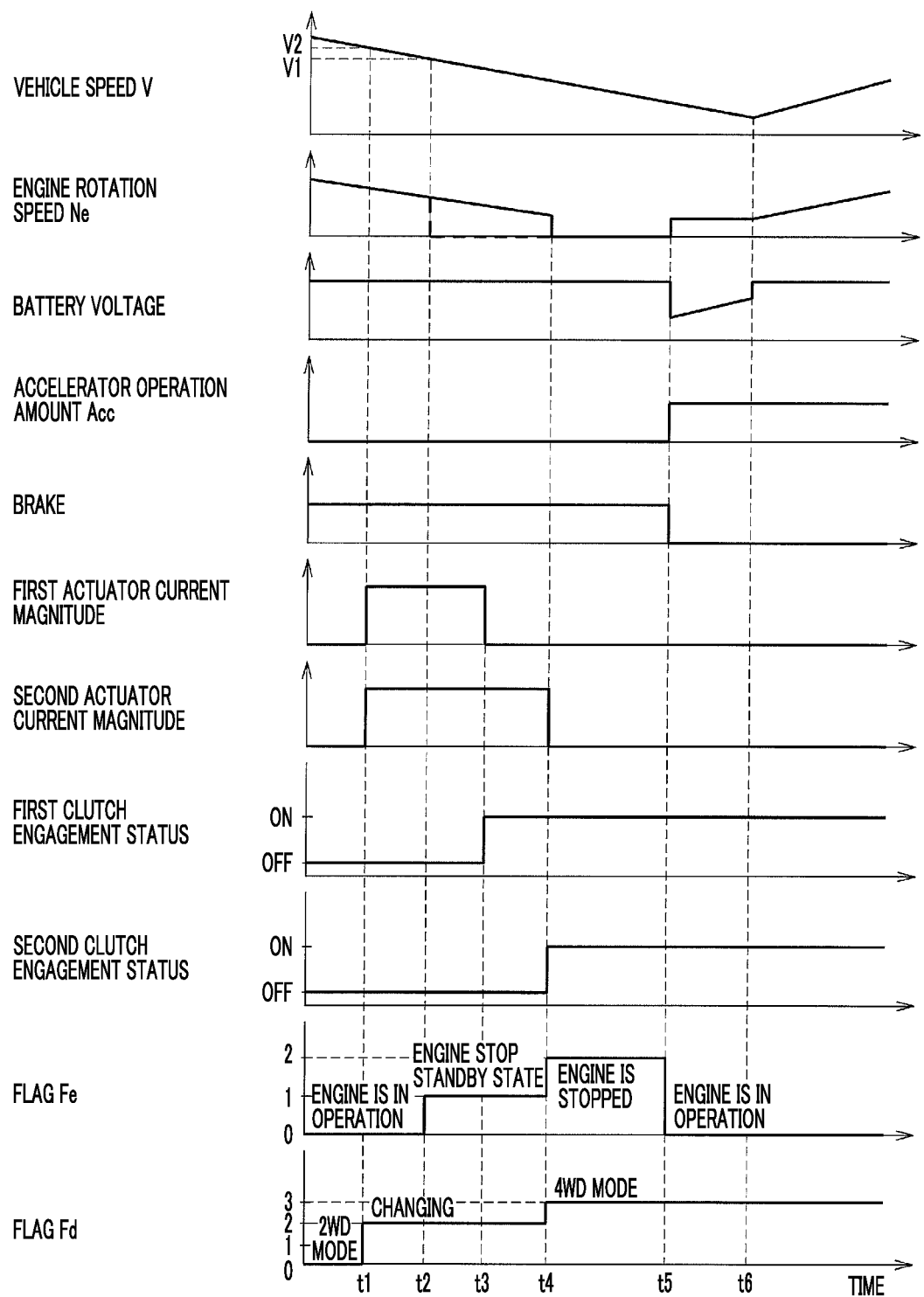
FIG. 7 is a chart corresponding to FIG. 2, showing a case where an engine automatic stop condition is satisfied in the middle of a change of the drive mode.

Next, the case where a change of the drive mode is started during operation of the engine 10 and the automatic stop condition of the engine 10 is satisfied at the time when the first clutch 4 and the second clutch 6 are operating will be described with reference to the timing chart shown in FIG. 7.

In this case, initially, for example, when the 4WD selection switch 105 is operated and the drive mode change condition is satisfied at time t1 at which the vehicle speed V is higher than the second vehicle speed V2, because the engine 10 is in the operating state (Fe=0), energization of the first actuator 5 and the second actuator 7 is started, and the first clutch 4 and the second clutch 6 begin to operate (Fd=2). When synchronization of rotation is being performed in each of the first clutch 4 and the second clutch 6, the vehicle speed V decreases to the second vehicle speed V2, and the automatic stop condition of the engine 10 is satisfied (time t2).

Because the value of the flag Fd is "2" at this time, the engine 10 is placed in the stop standby state (Fe=1), and the starter motor 10a is not operated. Thus, the amount of energization of each of the first actuator 5 and the second actuator 7 does not steeply reduce due to a steep decrease in the battery voltage, and there is no concern that a steep decrease in the battery voltage adversely influences the operations of the first clutch 4 and second clutch 6. If the accelerator pedal is depressed at this time, it is possible to immediately accelerate the vehicle 1.

When synchronization of rotation of the first clutch 4 completes and energization of the first actuator 5 is stopped at time t3, the first clutch 4 is engaged. Subsequently, when synchronization of rotation of the second clutch 6 completes and energization of the second actuator 7 is also stopped, the second clutch 6 is also engaged. As a change into the 4WD mode completes in this way (time t4), the value of the flag Fd is changed from "2" to "3", so, after that, the engine 10 is automatically stopped (Fe=2).

In the example of the chart, at time t5, the driver depresses the accelerator pedal, the restart condition is satisfied, and cranking for starting the engine 10 is started. At this time, the battery voltage is steeply decreasing as a result of the operation of the starter motor 10a; however, because drive mode change control has completed, the steep decrease in the battery voltage does not exert any adverse influence. When the startup of the engine 10 completes, the battery voltage quickly recovers (time t6).

As described above, with the control system for a vehicle according to the present embodiment, when the engine 10 is stopped while the vehicle 1 is traveling, a restart of the engine 10 is expected, so a change of the drive mode is prohibited in order to give a higher priority to a restart of the engine 10. Thus, even when the battery voltage steeply decreases as a result of a startup of the engine 10, there is no concern that the steep decrease adversely influences the operations of the first clutch 4 and second clutch 6, so it is possible to reduce vibration or noise, and it is possible to prevent a decrease in the durability of each of the first clutch 4 and the second clutch 6.

When the startup of the engine 10 completes in this way, it is possible to quickly change the drive mode through the operations of the first clutch 4 and second clutch 6 by energizing the first actuator 5 and the second actuator 7. At this time, because the battery voltage has recovered and electric power is generated by an alternator, it is easier to ensure the stability of the operations of the first clutch 4 and second clutch 6.

Because a startup of the engine 10 is given a higher priority, for example, there is no inconvenience that the driver experiences a sense of anxiety from a delay of a startup of the engine 10 although the driver is depressing the accelerator pedal. That is, it is possible to accelerate the vehicle 1 by starting the engine 10 without a delay from a driver's intention to depress the accelerator pedal.

On the other hand, when the drive mode change condition is satisfied during operation of the engine 10 and the first clutch 4 and the second clutch 6 are operated (including not only during operation of the clutches but also just before the operation), the engine 10 is not stopped even when the automatic stop condition is satisfied. With this configuration, if the restart condition is satisfied just after a stop of the engine 10, there is no concern that adverse influence is exerted on the operations of the first clutch 4 and second clutch 6 as a result of the restart.

In the present embodiment, the first clutch 4 and the second clutch 6 are operated such that the operating period of the first clutch 4 and the operating period of the second clutch 6 partially overlap with each other. Thus, it is advantageous that a change of the drive mode between the 2WD mode and the 4WD mode is quickly performed. However, because there is a high possibility that a decrease in the battery voltage adversely influences the operations of the two clutches, that is, the first clutch 4 and the second clutch 6, in a period during which the operations overlap with each other, it is significantly important to cause the operations of the first clutch 4 and second clutch 6 not to overlap with a startup of the engine 10 as described above.

The disclosure is not limited to the above-described embodiment. The disclosure encompasses various components other than those described above. For example, in the above-described embodiment, a change of the drive mode is prohibited until completion of a startup of the engine 10; however, the disclosure is not limited to this configuration. For example, a change of the drive mode may be prohibited until the battery voltage becomes higher than or equal to a value set in advance and no adverse influence is exerted on the operations of the first clutch 4 and second clutch 6. Alternatively, a change of the drive mode may be prohibited until a time set in advance elapses from the operation of the starter motor 10a.

That is, as shown in the example of FIG. 9, in a routine of drive mode change control, in step S301 after the start of the routine, the ECU 100 determines whether the drive mode change condition is satisfied as in the case of step S201 of the flowchart of FIG. 5. When negative determination is made (NO), the process once ends. On the other hand, when affirmative determination is made (YES), the process proceeds to step S302, and it is determined whether a predetermined period has elapsed from the operation of the starter motor 10a. A lapse of the predetermined period may be determined on the basis of, for example, the fact that the battery voltage becomes higher than or equal to a value set in advance, the fact that a time set in advance has elapsed from the operation of the starter motor 10a, or the like.

When negative determination is made on the basis of the fact that the above-described predetermined period has not elapsed (NO), the process proceeds to step S303, and the same process as the process of step S203 of the flowchart of FIG. 5 is executed. On the other hand, when affirmative determination is made on the basis of the fact that the above-described predetermined period has elapsed (YES), the process proceeds to step S304 to step S307, and the same processes as the processes of step S204 to step S207 of the flowchart of FIG. 5 are executed.

In the above-described embodiment, when drive mode change control is prohibited even when the 4WD selection switch 105 is operated during a stop of the engine 10, this situation is preferably informed to the driver of the vehicle 1. In this case, in a routine of drive mode change control as shown in the example of FIG. 10, the same processes of step S201 and step S202 of the flowchart of FIG. 5 are executed respectively in step S401 and step S402 after the start of the routine. When affirmative determination is made in step S402 (YES), the process proceeds to step S403.

In step S201, the ECU 100 determines whether the change condition based on which affirmative determination is made is an operation of the 4WD selection switch 105. When affirmative determination is made (YES), the process proceeds to step S404, and informs via an information unit 18 that a change of the drive mode is prohibited. After that, the process proceeds to step S405, and the same process as the process of step S203 of the flowchart of FIG. 5 is executed. An example of the information unit 18 includes a lamp, a buzzer, a display, and the like. The information unit 18 is not limited to these devices. The information unit 18 just needs to be configured to inform the driver of a prohibition of the change. For example, a lamp should be lit or blinked, a buzzer should be sounded.

On the other hand, when negative determination is made in step 403 on the basis of the fact that the change condition satisfied in step S201 is not an operation of the 4WD selection switch 105 (NO), the process proceeds to step S406 to step S409, and the same processes as the processes of step S204 to step S207 of the flowchart of FIG. 5 are executed.

Figure 8:
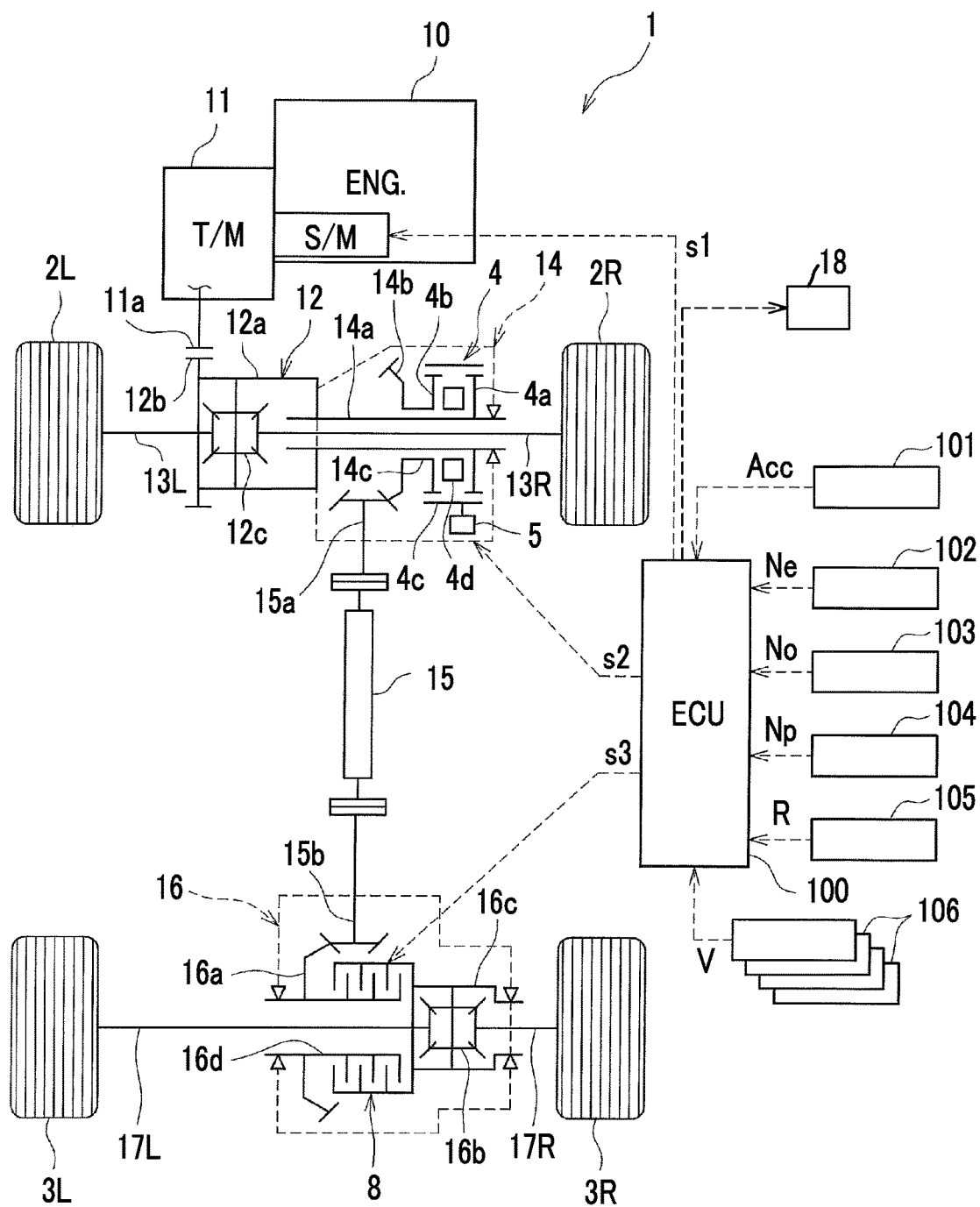
FIG. 8 is a view corresponding to FIG. 1, according to another embodiment that uses a multi-disc type friction clutch as a second clutch.

In the above-described embodiment, each of the first clutch 4 and the second clutch 6 is formed of a dog clutch, and is configured to be operated by a corresponding one of the electromagnetic actuators 5, 7; however, the disclosure is not limited to this configuration. For example, each of the first clutch 4 and the second clutch 6 may be formed of a dog clutch that is configured to be operated by a hydraulic pressure that is supplied via an electromagnetic valve. Not limited to a dog clutch, for example, the rear differential unit 16 may include a second clutch 8 formed of a multi-disc friction clutch as shown in the example in FIG. 8. The second clutch 8 may be of an electromagnetic type or may be of a hydraulic type that is operated by a hydraulic pressure that is supplied via an electromagnetic valve.

In the above-described embodiment, the drivetrain includes two clutches, that is, the first clutch 4 and the second clutch 6, and, in the 2WD mode, both the first clutch 4 and the second clutch 6 are released to stop the rotation of the propeller shaft 15, and the like, between the first clutch 4 and the second clutch 6; however, the disclosure is not limited to this configuration. For example, the disclosure is applicable to a four-wheel drive vehicle in which a drivetrain includes only one clutch and the clutch is operated to change the drive mode into the 2WD mode or the 4WD mode.

The disclosure is directed to, in a four-wheel drive vehicle configured to automatically stop or restart an engine and to change a drive mode, reducing vibration or noise resulting from an operation of a clutch in a drivetrain and preventing a decrease in durability without causing a driver to experience a sense of anxiety. Therefore, it is highly advantageous when the disclosure is applied to particularly a passenger car.

What is claimed is:
1. A vehicle comprising:
a pair of front wheels;
a pair of rear wheels;
an engine including a starter motor;
a clutch configured to be engaged and released to change a drive mode of the vehicle into any one of a four-wheel drive mode and a two-wheel drive mode, the four-wheel drive mode being a mode in which both the pair of front wheels and the pair of rear wheels are driven, the two-wheel drive mode being a mode in which any one of the pair of front wheels and the pair of rear wheels is driven;

a battery, the starter motor of the engine and the clutch being configured to be supplied with electric power from the same battery; and an electronic control unit configured to change the engine into any one of an operating state and a stopped state while the vehicle is traveling, the electronic control unit being configured to operate the starter motor by supplying electric power from the battery to the starter motor when the engine is changed from the stopped state to the operating state, the electronic control unit being configured to execute drive mode change control for changing the drive mode into any one of the two-wheel drive mode and the four-wheel drive mode by operating the clutch with electric power, the electric power being supplied from the battery to the clutch while the vehicle is traveling, the electronic control unit being configured not to execute the drive mode change control when the engine is in the stopped state, and the electronic control unit being configured to execute the drive mode change control after a lapse of a predetermined period from a start of operation of the starter motor at a startup of the engine.

2. The vehicle according to claim 1, wherein
the electronic control unit is configured to
determine the predetermined period is lapsed when a rotation speed of the engine becomes higher than or equal to a value set in advance.

3. The vehicle according to claim 1, wherein
the electronic control unit is configured to
determine the predetermined period is lapsed when a voltage of the battery becomes higher than or equal to a value set in advance.

4. The vehicle according to claim 1, wherein
the electronic control unit is configured to
determine the predetermined period is lapsed when a lapse of a time set in advance.

5. The vehicle according to claim 1, wherein
the electronic control unit is configured not to
change the engine into the stopped state when the drive mode change control is executed by the electronic control unit during operation of the engine.

6. The vehicle according to claim 1, wherein
the electronic control unit is configured to change the drive mode into the four-wheel drive mode when a vehicle speed becomes lower than or equal to a predetermined vehicle speed, and
the electronic control unit is configured to change the engine into the operating state when an accelerator operation amount becomes higher than or equal to a predetermined accelerator operation amount.

7. The vehicle according to claim 1, further comprising:
an information unit, wherein
the electronic control unit is configured to:
change the drive mode in response to a switch operation of a driver of the vehicle; and
inform the driver of the vehicle through the information unit that the drive mode is not changed when the switch operation has been performed in the stopped state of the engine.

8. The vehicle according to claim 1, wherein
the clutch includes a first clutch and a second clutch, the first clutch is configured to transmit and interrupt driving force from the engine to a propeller shaft, the second clutch is configured to transmit and interrupt driving force from the propeller shaft toward the rear wheels, and
the electronic control unit is configured to
operate the first clutch and the second clutch such that a first period and a second period at least partially overlap with each other,
the first period is a period that the drive mode is changed by the first clutch, and the second is a period that the drive mode is changed by the second clutch.

9. The vehicle according to claim 1, wherein
the clutch is at least one of a hydraulic clutch and an electromagnetic clutch, the hydraulic clutch is configured to be operated by a hydraulic pressure, and the electromagnetic clutch is configured to be operated by an electromagnetic actuator, the hydraulic pressure is supplied via an electromagnetic valve.

10. A control method for a vehicle, the vehicle including
a pair of front wheels,
a pair of rear wheels,
an engine including a starter motor,
a clutch configured to be engaged and released to change a drive mode of the vehicle into any one of a four-wheel drive mode and a two-wheel drive mode, the four-wheel drive mode being a mode in which both the pair of front wheels and the pair of rear wheels are driven, the two-wheel drive mode being a mode in which any one of the pair of front wheels and the pair of rear wheels is driven,
a battery, the starter motor of the engine and the clutch being configured to be supplied with electric power from the same battery, and
an electronic control unit,
the control method comprising:
changing, by the electronic control unit, the engine into any one of an operating state and a stopped state while the vehicle is traveling;
operating, by the electronic control unit, the starter motor by supplying electric power from the battery to the starter motor when the engine is changed from the stopped state to the operating state;
executing, by the electronic control unit, drive mode change control for changing the drive mode into any one of the two-wheel drive mode and the four-wheel drive mode by operating the clutch with electric power, the electric power being supplied from the battery to the clutch while the vehicle is traveling;
not executing, by the electronic control unit, the drive mode change control when the engine is in the stopped state; and
executing the drive mode change control, by the electronic control unit, after a lapse of a predetermined period from a start of operation of the starter motor at a startup of the engine.

* * * * *